United States Patent [19]

Harris

[11] 4,216,923
[45] Aug. 12, 1980

[54] TARGET TYPE THRUST REVERSER

[75] Inventor: Alfred W. Harris, Bellevue, Wash.

[73] Assignee: Boeing Commercial Airplane Company, Seattle, Wash.

[21] Appl. No.: 904,142

[22] Filed: May 9, 1978

Related U.S. Application Data

[63] Continuation-in-part of Ser. No. 782,804, Mar. 30, 1977.

[51] Int. Cl.² .................. B64C 15/08; F02K 3/02; B64D 33/04
[52] U.S. Cl. ...................... 244/110 B; 60/226 A; 239/265.27; 239/265.33
[58] Field of Search .................. 244/110 B, 113; 40/226 R, 226 A, 230; 239/265.19, 265.25, 265.27, 265.31, 265.33, 265.37, 265.39

[56] References Cited

U.S. PATENT DOCUMENTS

| 2,841,954 | 7/1958 | Rainbow | 239/265.31 |
| 3,422,624 | 1/1969 | Brooks et al. | 60/230 |
| 3,434,288 | 3/1969 | Petrie | 60/230 |
| 3,531,049 | 9/1970 | Ham | 239/265.29 |
| 3,614,037 | 10/1971 | Vdolek | 239/265.19 |
| 3,655,133 | 4/1972 | Medawar et al. | 60/230 |
| 3,820,720 | 6/1974 | Anders | 239/265.39 |
| 4,026,105 | 5/1977 | James | 60/230 |

Primary Examiner—Galen L. Barefoot
Attorney, Agent, or Firm—Ronald E. Suter; Bernard A. Donahue

[57] ABSTRACT

An aircraft thrust reverser having a plurality of doors rotatably secured to linkage members at each door's center, and rotatably secured to a carriage ring at one end. As the carriage ring moves toward the direction of travel of the aircraft, the linkage members cause the doors to extend in a forward slope, intercepting fan air and directing it outward and forward.

17 Claims, 7 Drawing Figures

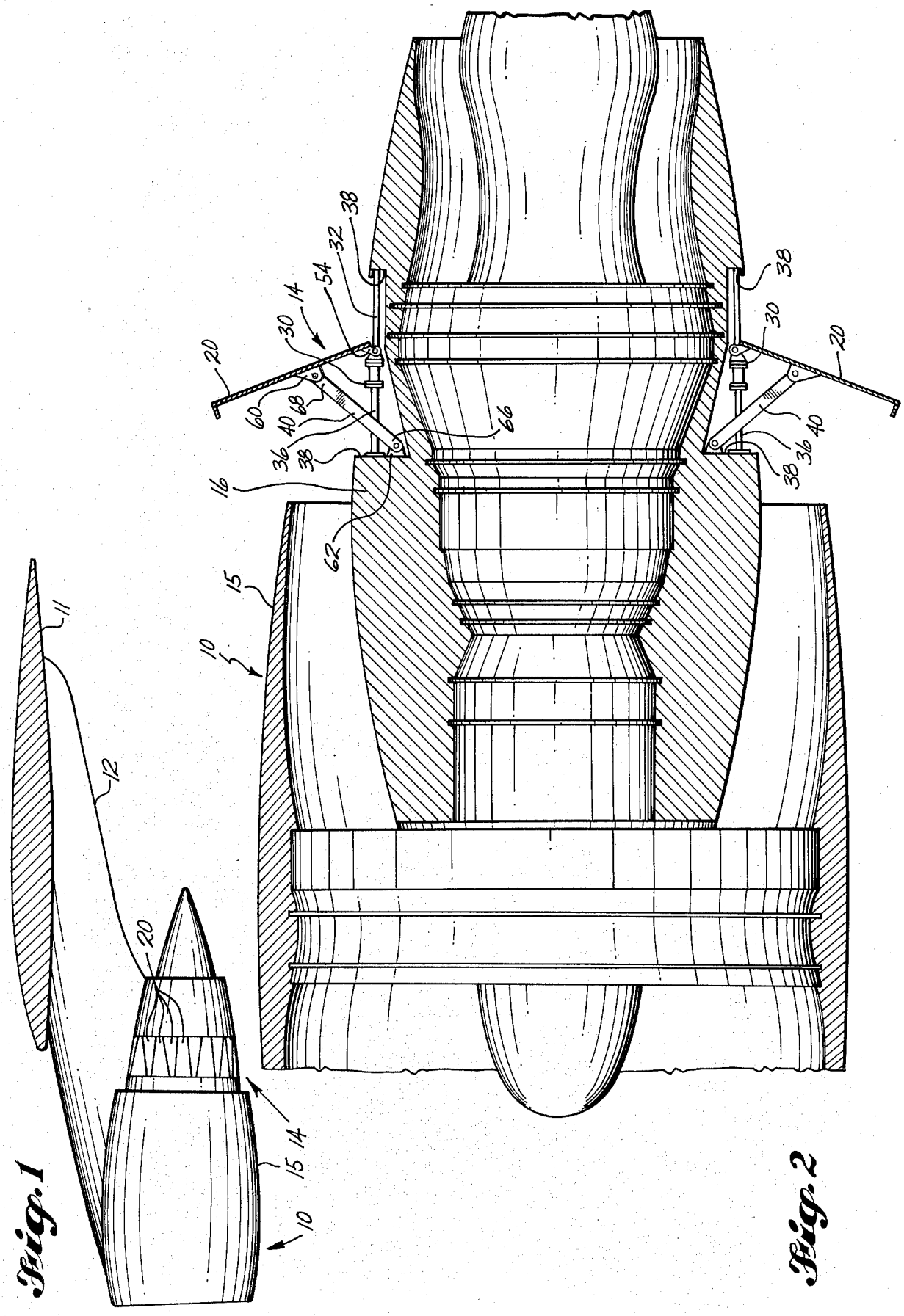

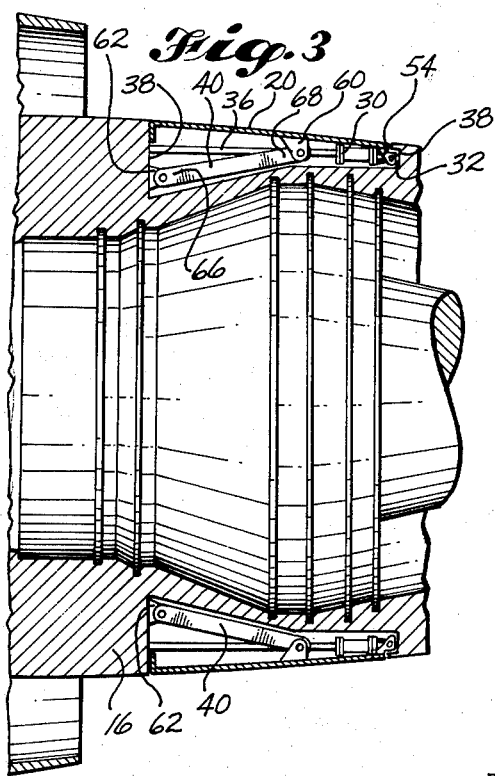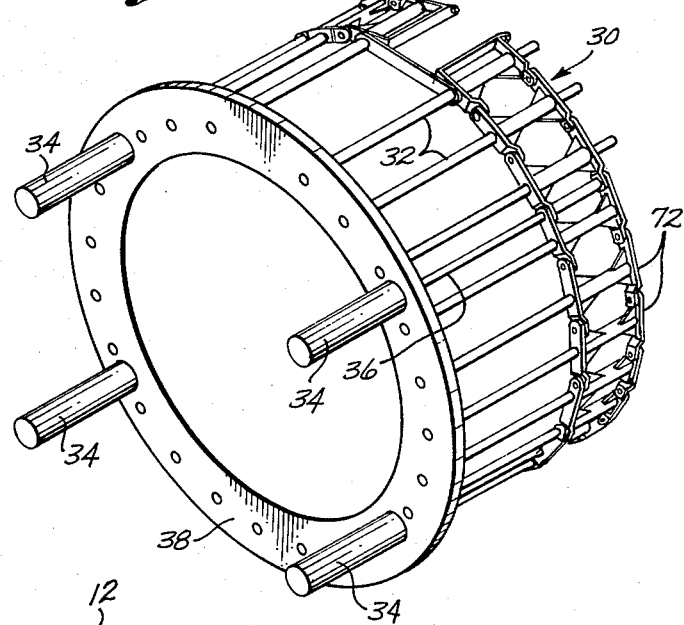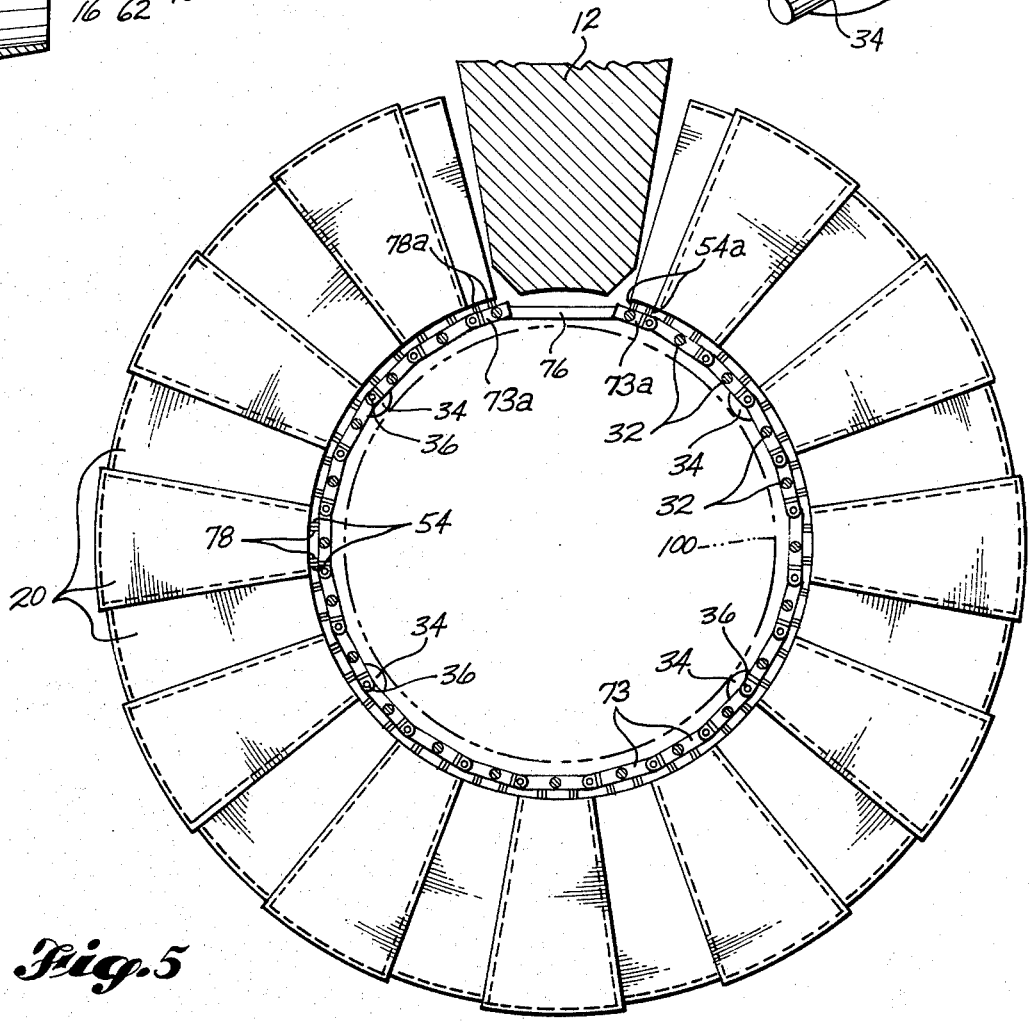

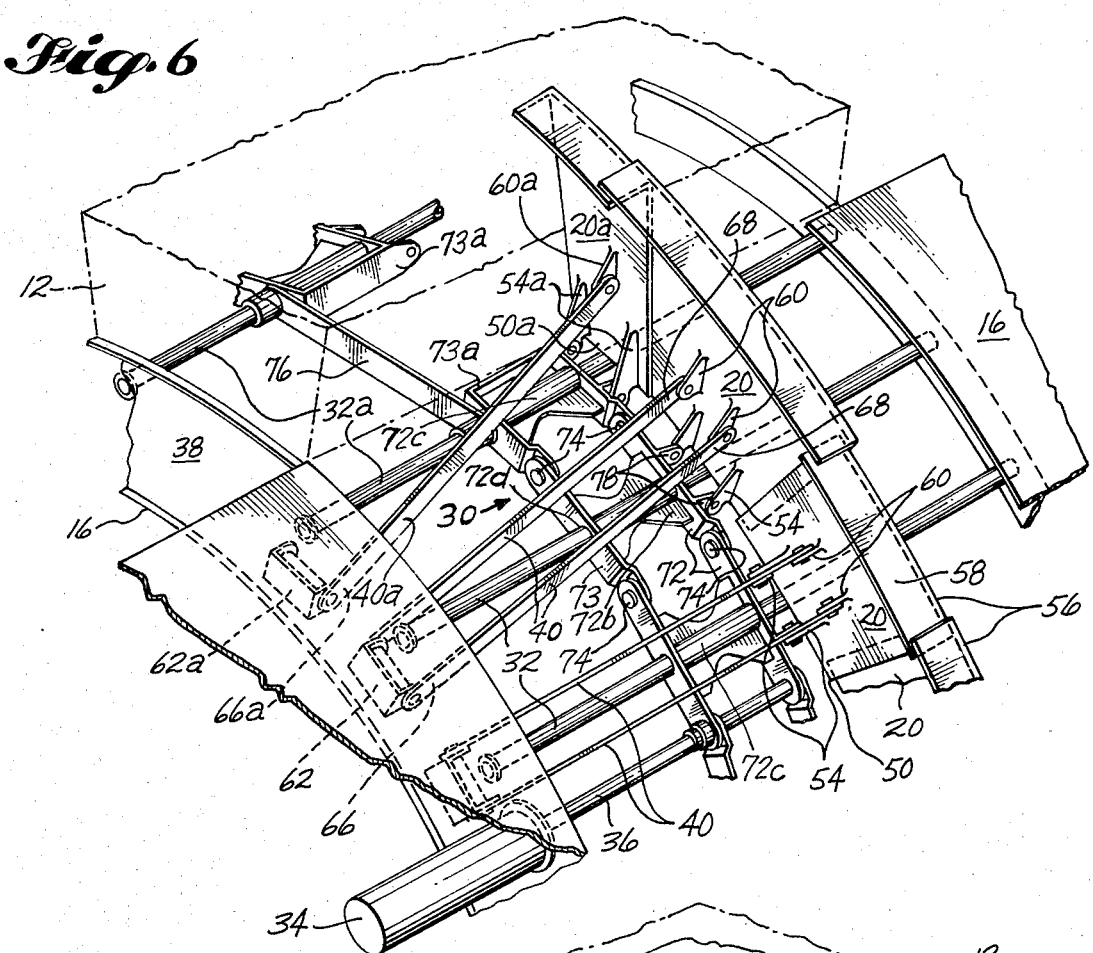

TARGET TYPE THRUST REVERSER

BACKGROUND OF THE INVENTION

This application is a continuation-in-part of my application Ser. No. 782,804 filed Mar. 30, 1977.

1. Field of the Invention

The present invention relates to a thrust reverser for a gas turbine aircraft engine.

2. Description of Prior Art

Current high by-pass ratio turbo-fan engines, such as those used on the Boeing 747 aircraft, have deactivated the hot air or primary reverse thrust systems, and utilized a fan air duct reversing approach. Existing fan air duct reversers are typically high in cost and of relatively low reliability. Generally, these systems are designed to provide a separate nozzle for the fan duct airflow in the reverse thrust mode which adversely affects the engine matching parameters, especially during transitions between forward thrust and reverse thrust modes.

The present invention provides a target-type thrust reverser controlled by an uncomplicated linkage mechanism to overcome these objections.

SUMMARY OF THE INVENTION

The primary object of the present invention is to provide a thrust reverser utilizing a fixed cruise configuration nozzle which controls the engine match parameters during thrust reverser transition modes.

Yet another object of the present invention is to provide a thrust reverser adaptable to the longer acoustic fan air duct exhaust configurations.

In accordance with the present invention there is provided a target-type reverser to intercept fan duct air and direct it outwardly and forwardly.

More particularly, a thrust reverser is provided which comprises a plurality of thrust reverser doors arranged in a plurality of tiers located substantially behind the fan air duct and substantially around the engine, each reverser door being rotatably secured to a translation means at one end, and rotatably secured to a linkage member at its center such that when an activation means moves the translation means toward the fan air duct along a plurality of guide means, the linkage member causes the plurality of thrust reverser doors to open and form a forwardly sloped wall to intercept the fan air and direct it outwardly and forwardly. With the thrust reverser doors arranged in a plurality of tiers, it can be seen that when the doors are in the reverse thrust position, leakage between reverser doors is minimized resulting in maximum thrust reverser effectiveness.

The foregoing and other objects, features, and advantages of the present invention will become more apparent in the light of the following detailed description of a preferred embodiment as illustrated in the accompanying drawings.

DESCRIPTION OF THE DRAWINGS

FIG. 1 is a side view of a typical wing-mounted gas turbine aircraft engine showing both the fan air and primary exhaust ducts and the location of the thrust reverser apparatus of the present invention.

FIG. 2 is an enlarged side view of a gas turbine engine showing the present invention with the thrust reverser apparatus in the reverse thrust mode.

FIG. 3 is a view similar to a portion of FIG. 2 but showing the thrust reverser apparatus in the cruise mode.

FIG. 4 is an isometric view of the carriage ring, actuators, and slide guides.

FIG. 5 is a view from behind the engine showing the thrust reverser apparatus in the reverse thrust position.

FIG. 6 is an isometric view of a portion of the thrust reverser apparatus showing the apparatus in the reverse thrust mode.

FIG. 7 is a view similar to FIG. 6 but showing the thrust reverser apparatus in the cruise mode.

DESCRIPTION OF THE PREFERRED EMBODIMENT

Referring now to FIG. 1, there is shown a typical wing mounted gas turbine aircraft engine. The engine, shown generally at 10, is secured to aircraft wing 11 by nacelle strut 12. In the preferred embodiment, the thrust reverser apparatus 14 of the present invention is located circumferentially around the engine turbine case and behind fan air duct 15. This location permits maintenance access to engine core area accessories.

The present invention can better be understood by reference to FIGS. 2 through 7. Generally, the preferred embodiment comprises a plurality of thrust reverser doors 20 arranged circumferentially around the engine turbine case. Doors 20 are trapezoidal in shape and are arranged in a plurality of tiers with one tier of doors substantially overlaying another tier of doors. When fully deployed in the reverse thrust position (reference FIG. 5), adjacent doors 20 slightly overlap each other (as shown by the dotted lines) minimizing leakage between adjacent reverser doors.

Each door 20 is pivotally secured at one end to a translation means. As shown in FIG. 4, the translation means comprises carriage ring 30, a plurality of slide guides 32, a plurality of pneumatic actuators 34, and a plurality of actuator rods 36 attached to carriage ring 30 at one end, and to actuators 34 at the other end. Actuators 34 are secured to fixed bulkheads 38 of housing 16 of engine 10. Carriage ring 30 is constructed from member segments with the segments pivotally secured to each other. Each thrust reverser door 20 is joined by connecting linkage to a rigid portion of engine 10. Linkage members 40 are pivotally attached to doors 20, substantially at each door's center, and pivotally to housing 16 of engine 10.

In operation and when in the cruise position, thrust reverser doors 20 are retracted and blend in with the exterior surface of the turbine cowling. During the reverse thrust mode, the plurality of actuators 34 through the plurality of actuator rods 36 attached to carriage ring 30, draw the carriage ring toward the direction of travel of the aircraft. Carriage ring 30 during this movement is guided by the plurality of slide guides 32. As the carriage ring moves along the direction of travel, the plurality of linkage members 40 cause thruster doors 20 to open and form a forwardly sloped wall to intercept fan air and direct it outwardly and forward.

Referring now to FIG. 6, the invention is shown with the thrust reversing apparatus in its extended position with reverser sections 20 extending in the upstream direction and outwardly from the turbine case. The downstream end 50 of each reverser section 10 includes a pair of bosses 54, and the upstream end 56 of each reverser section defines a flange portion 58 extending radially inwardly when the reverser section is in its retracted position. Each reverser section also includes a pair of bosses 60 which are spaced apart in the circumferential direction and substantially centered on the inside face of the section.

The turbine cowling of the engine includes a frame or housing 16 having a plurality of pairs of bosses 62 fixed thereto. A plurality of rigid guide members are fixed to the housing 16 at opposite ends thereof, and these guide members or rods 32 are parallel to one another and generally parallel to the longitudinal axis of the engine.

A plurality of linkage members are provided in the form of rigid links 40, and each link 40 includes a first end 66 and a second end 68. Each link 40 connects a boss 62 to a corresponding boss 60 longitudinally aligned therewith. First end 66 is pivotally mounted to housing 16 at a first location adjacent boss 62, and second end 68 is pivotally mounted to the corresponding boss 60. As best seen in FIG. 6, each reverser section 20, except for the two sections 20a on either side of the nacelle strut 12, is connected to housing 16 by a pair of parallel linkage members 40. In the various figures the linkage and related structure associated with the sections 20a are also labeled with the ltter "a" following the identifying numeral.

Carriage ring 30 is slidably mounted for linear movement on rods 32, and comprises rigid links 72 secured together in axially opposed pairs by a web 72b forming a rigid segment 73. Segments 73 are pivotally connected to one another at pairs of co-axial pivot points 74 to form a substantially continuous generally annular structure. The ring 30 is continuous except for the space through which strut 12 passes, and this gap is bridged by a rigid link 76 connect rods 32a on opposite sides of the strut so that forces will be transmitted across the gap by the rods 32a and link 76. The link 76 is fixed rigidly to both rods 32a so that no axial movement of the link 76 with respect to the rods is possible. The end portions of link 76 may, therefore, also act as a stop for limiting movement of the ring in the upstream direction.

Each segment 73 also includes a cylindrical bore 72c formed by web 72b which, along with openings 72d provide a longitudinal passageway for receiving an associated guide rod 32, and each such passageway encompasses a portion of its associated rod so as to provide a bearing surface for contacting the rod as the carriage ring slides along the guide means. Movement of the ring linearly in the axial direction between the extremes of its travel is accomplished by actuation means, which may comprise a plurality of linear actuators such as hydraulic or pneumatic actuators 34 including actuator rods 36 circumferentially spaced around the engine as shown in FIGS. 4 and 5. The actuation means will preferably include controls (not shown) so that the position of the carriage ring along the guide members may be selectively controlled from within the aircraft.

As shown in FIG. 6, each segment 73 also includes a pair of bosses 78 for pivotal connection to a corresponding pair of bosses 54. The two pivotal connections between corresponding pairs of bosses 78 and 54 share a common axis and establish what may be referred to as a hinge point on the axis and between the bosses of the same pair. The hinge points together generally define a circle of fixed diameter about the axis of the engine. The pivotal connections between the pairs of bosses 62 and first ends 66 of links 40 similarly define hinge points arranged around the longitudinal axis of the engine, as do the pivotal connections between pairs of bosses 60 and second ends 68 of the links 40.

Thus, the pivotal connections between links 40 and housing 16 establish a plurality of first hinge points generally defining a circle 100 (see FIG. 5) of fixed diameter about the longitudinal axis of the engine, the pivotal connections between reverser sections 20 and translation member 30 establish a plurality of second hinge points generally defining a circle of fixed diameter about the axis of the engine, and the pivotal connections between links 40 and reverse sections 20 establish a plurality of third hinge points generally defining a circle whose diameter varies as a function of the portion of the carriage ring.

As noted above, the carriage ring is movable in the longitudinal or axial direction between an extreme upstream position (shown in FIG. 6) and an extreme downstream position (shown in FIG. 7). As the ring moves between these two extreme positions the reverser sections move together, maintaining a substantially continuous surface for intercepting and redirecting fan air from the fan duct. The sections 20 move in a controlled manner both longitudinally and radially with respect to the axis of the engine, and this movement is continuous in response to the movement of the carriage ring. The thrust reversing apparatus assumes an extended position as shown in FIGS. 2, 5, and 6 with the translation member in its extreme upstream position and assumes a retracted position as shown in FIGS. 3 and 7 with the translation member in its extreme downstream position.

As can be best seen in FIGS. 2 and 5, the circle of first hinge points has a diameter somewhat smaller than the circle of second hinge points, and the circle of third hinge points has a diameter at least somewhat greater than that of a circle half way between the circles defined by the first and second hinge points respectively. This geometric relationship among the three sets of hinge points facilitates controlled movement of the thrust reverser apparatus in response to the actuation means despite large forces applied by the impact of fan air against the surface of the thrust reverser.

The provision of pivotal connections between each segment 20 and its corresponding carriage ring segment 73 at two circumferentially spaced-apart locations also contributes to the stability of the thrust reverser apparatus, and the substantially annular configuration of the carriage ring insures that all sections 20 of the thrust reversing apparatus will move together simultaneously. The annular configuration of ring 30 also causes the forces applied against the reversing apparatus to be distributed around the engine, and the segmented construction of the ring ring minimizes any possible concentration of stresses at any locations along the circumference thereof.

Accordingly, the foregoing description of my invention discloses a preferred embodiment thereof, and various changes in form and detail may be made within the scope of the invention which is defined and limited only by the following claims.

What is claimed is:

1. In an aircraft engine including a turbine housing, a forward fan, a fan air duct surrounding said fan and said housing and extending rearwardly along said housing for a distance less than the axial length of said housing, thrust reversing apparatus comprising:

a plurality of reverser doors mounted circumferentially around the exterior surface of said turbine housing downstream of said fan air duct, each said reverser door including an upstream end and a downstream end;

linkage means including a plurality of linkage members each having a first end pivotally mounted to said housing and a second end pivotally attached to one of said reverser doors substantially intermediate said upstream and said downstream ends thereof;

a carriage ring disposed around said housing, said carriage ring comprising a plurality of rigid segments, each of said segments being pivotally attached to its adjacent segment and forming bearing means for supporting said carriage ring and said carriage ring being pivotally connected at a plurality of circumferentially spaced-apart locations to said downstream ends of said reverser doors whereby stress concentrations in said ring are minimized;

guide means for engaging said bearing means and guiding said carriage ring for linear sliding movement with respect to said housing along said guide means; and actuation means for selectively moving said carriage ring along said guide means, said reverser door moving radially outwardly with respect to said housing between an extended position in the path of fan air from said fan air duct and a retracted position in response to said movement of said carriage ring.

2. In an aircraft engine as claimed in claim 1 wherein said guide means comprises a plurality of guide rods fixed to said housing and passing through said bearing means.

3. In an aircraft engine as claimed in claim 1 wherein said actuation means comprises a plurality of linear actuators circumferentially spaced around said housing and connected between said housing and said carriage ring.

4. In an aircraft engine as claimed in claim 1 wherein said first ends of said linkage members are mounted to said housing at a plurality of first hinge points and said downstream ends of said reverser doors are pivotally connected to said carriage ring at a plurality of second hinge points, said first hinge points located radially inwardly from said second hinge points.

5. In an aircraft engine as claimed in claim 1 wherein each of said reverser doors is connected to a different one of said segments, whereby stability of the thrust reverser apparatus is enhanced.

6. In an aircraft engine as claimed in claim 5 wherein each said reverser door is pivotally connected to its respective segment at two circumferentially spaced-apart locations.

7. In an aircraft engine as claimed in claim 1 wherein each said reverser door is connected to two generally parallel linkage members.

8. In an aircraft engine as claimed in claim 2 wherein said guide rods number at least three.

9. In an aircraft engine as claimed in claim 1 wherein each segment comprises a pair of axially spaced rigid links which are connected by a rigid web, said bearing means being formed by a passageway extending axially through said links and said web.

10. In an aircraft engine as claimed in claim 9 wherein said guide means comprises a plurality of guide rods, said rods passing through said passageways to guide the movement of said carriage ring.

11. In an aircraft engine as claimed in claim 1 wherein said actuation means comprises a plurality of pneumatic actuators.

12. In an aircraft engine as claimed in claim 1 wherein said reverser doors are mounted in a plurality of tiers with one tier of doors substantially overlaying another tier of doors.

13. In an aircraft engine as claimed in claim 12 wherein said reverser doors are trapezoidal in shape and, when in the operative position, overlap each other along substantially the entire circumference of the fan air duct exit to provide a substantially continuous reversing surface.

14. In an aircraft engine including a turbine housing, a fan air duct surrounding said housing, and a thrust reverser for acting on fan air downstream of the fan air duct, said thrust reverser substantially encompassing said housing and movable between an extended position and a retracted position, said thrust reverser including a plurality reverser doors for defining a substantially continuous surface and each said reverser door including an upstream end and downstream end; improved means for selectively operating said thrust reverser between said extended and said retracted positions, said means comprising:

a plurality of linkage members each having a first end pivotally mounted to said housing and a second end pivotally connected to one of said reverser doors between said upstream and said downstream ends thereof;

guide members fixed to said housing;

a generally annular carriage ring disposed around said housing and mounted for sliding linear movement along said guide member, said carriage ring comprising a plurality of rigid segments, each of said segments being pivotally attached to its adjacent segment and each segment providing bearing means for engaging said guide members and said ring being pivotally connected at a plurality of circumferentially spaced-apart locations to said downstream ends of said reverser doors; and a plurality of actuators circumferentially spaced around said housing for selectively moving said carriage ring along said guide members, whereby said thrust reverser moves radially between said extended and said retracted positions in response to corresponding linear movement of said carriage ring and said radial movement of said thrust reverser is continuous in response to said corresponding linear movement.

15. In an aircraft engine as claimed in claim 14 wherein each said reverser door is pivotally connected to said carriage ring at two circumferentially spaced-apart locations.

16. In an aircraft as claimed in claim 14 wherein said first ends of said linkage members are mounted to said housing at a plurality of first hinge points and said downstream ends of said reverser doors are pivotally connected to said carriage ring at a plurality of second hinge points, said first hinge points located radially inwardly from said second hinge points.

17. In an aircraft engine as claimed in claim 14 wherein each said guide member comprises a rod, each reverser door being pivotally connected to a separate segment and the bearing means of each segment engaging a separate rod, whereby stability of the reverser apparatus is enhanced.

* * * * *